(12) United States Patent
Honda et al.

(10) Patent No.: US 7,840,688 B2
(45) Date of Patent: Nov. 23, 2010

(54) INFORMATION PROCESSING DEVICE, SERVER CLIENT SYSTEM, METHOD, AND COMPUTER PROGRAM

(75) Inventors: Yasuaki Honda, Chiba (JP); Norifumi Kikkawa, Tokyo (JP); Tatsuya Igarashi, Tokyo (JP); Yoichi Kobori, Kanagawa (JP); Takehiko Morita, Kanagawa (JP)

(73) Assignee: Sony Corporation, Tokyo (JP)

( * ) Notice: Subject to any disclaimer, the term of this patent is extended or adjusted under 35 U.S.C. 154(b) by 939 days.

(21) Appl. No.: 10/535,183

(22) PCT Filed: Nov. 18, 2003

(86) PCT No.: PCT/JP03/14634

§ 371 (c)(1),
(2), (4) Date: Jan. 12, 2006

(87) PCT Pub. No.: WO2004/049633

PCT Pub. Date: Jun. 10, 2004

(65) Prior Publication Data

US 2006/0253852 A1    Nov. 9, 2006

(30) Foreign Application Priority Data

Nov. 22, 2002    (JP) .............................. 2002-339080

(51) Int. Cl.
*G06F 15/173*    (2006.01)
*G06F 15/16*    (2006.01)
*G06F 7/04*    (2006.01)

(52) U.S. Cl. ............................ 709/229; 709/226; 726/3

(58) Field of Classification Search ................. 709/221, 709/225; 726/1–4
See application file for complete search history.

(56) References Cited

U.S. PATENT DOCUMENTS

| | | | | |
|---|---|---|---|---|
| 6,865,673 | B1 * | 3/2005 | Nessett et al. ................ | 713/155 |
| 2003/0110240 | A1 * | 6/2003 | Lockridge et al. ............ | 709/220 |

FOREIGN PATENT DOCUMENTS

| | | |
|---|---|---|
| JP | 7-303106 | 11/1995 |
| JP | 9-233111 | 9/1997 |
| JP | 2002-159053 | 5/2002 |
| JP | 2002-325079 | 11/2002 |

\* cited by examiner

*Primary Examiner*—Joseph E Avellino
*Assistant Examiner*—Afshawn Towfighi
(74) *Attorney, Agent, or Firm*—Oblon, Spivak, McClelland, Maier & Neustadt, L.L.P.

(57) ABSTRACT

There are provided an apparatus and method that generate a MAC list that serves as an access control list efficiently without burdening a user. A MAC list registration processing request packet is automatically transmitted by using as a trigger either a power-on process of the power source of a client apparatus connected to a network or an activation process of a specific application, e.g., an execution application for services using a home network. A server performs a registration process by acquiring information such as a MAC address from the received packet in accordance with a state of empty slots in the MAC list. According to this configuration, it is possible to easily and correctly generate the MAC list, which serves as the access control list, without burdening a user.

19 Claims, 11 Drawing Sheets

| SLOT No. | REGISTRATION DATA |
|---|---|
| #01 | MAC ADDRESS/CLIENT NAME/REGISTRATION TIME & DATE /(ID, KEY INFORMATION) OTHERS |
| #02 | MAC ADDRESS/CLIENT NAME/REGISTRATION TIME & DATE /(ID, KEY INFORMATION) OTHERS |
| #03 | (EMPTY SLOT) |
| #04 | (CLOSE) |
| : | (CLOSE) |

| SLOT No. | REGISTRATION DATA |
|---|---|
| #01 | MAC ADDRESS/CLIENT NAME/REGISTRATION TIME & DATE /(ID, KEY INFORMATION) OTHERS |
| #02 | MAC ADDRESS/CLIENT NAME/REGISTRATION TIME & DATE /(ID, KEY INFORMATION) OTHERS |
| #03 | (EMPTY SLOT) |
| #04 | (CLOSE) |
| .. | (CLOSE) |

*Fig.4*

```
B-POST * HTTP/1.1
HOST:192.254.255.255:3536
Content-Type:application/....
Content-Length:65
Broadcast  SNAC
Method:Register
```

Fig. 7

INFORMATION PROCESSING DEVICE, SERVER CLIENT SYSTEM, METHOD, AND COMPUTER PROGRAM

TECHNICAL FIELD

The present invention relates to an information processing apparatus, a server client system and method, and a computer program. More particularly, the present invention relates to an information processing apparatus, a server client system and method, and a computer program, wherein in the configuration which executes communications among network-connected apparatuses, access privilege judgment information is generated efficiently without burdening users to allow an access limitation process to be executed in accordance with the generated judgment information.

BACKGROUND ART

Following the advent of recent widespread data communication networks, so-called home networks are prevailing which allow communications among network-connected apparatuses including home electric appliances, computers and other peripheral apparatuses. The home network provides users with conveniences and comfortableness through communications among network-connected apparatuses, such as sharing a data processing function of each apparatus and content transmission/reception among apparatuses. It is therefore predicted that home networks spread further in the future.

As the protocol suitable for the configuration of the home network, a Universal Plug and Play (UPnP) is known. The Universal Plug and Play (UPnP) facilitates to configure a network without involving any complicated manipulations, and allows each network-connected apparatus to receive services provided by other connected apparatuses without difficult manipulations and settings. UPnP has the advantage that it does not rely upon an OS (operating system) of a device and addition of devices is easy.

UPnP exchanges an XML (extensible Markup Language) compliant definition file among connected apparatuses to effect mutual recognition among the apparatuses. The following is the summary of UPnP processes.

(1) An addressing process of acquiring own device ID such as an IP address.

(2) A discovery process of searching each device on a network and receiving a response from each device to acquire information such as a device type and a function contained in the response.

(3) A service request process of requesting each device for services in accordance with the information acquired by the discovery process.

With the above-described procedure, service provision and reception become possible by using network-connected apparatuses. An apparatus to be newly connected to a network acquires a device ID by the addressing process, acquires information of another network-connected device by the discovery process, and can request another apparatus for services in accordance with the acquired information.

It is, however, necessary for the network of this type to consider a countermeasure against illegal accesses. An apparatus in the home network, such as a server, often stores contents such as private contents and charged contents whose copyright is required to be managed.

Contents stored in such a server in the home network can be accessed from another network-connected apparatus. For example, an apparatus effected UPnP connection, which is the above-described simple apparatus connection configuration, can acquire the contents. If the contents are movie data or music data, a user of a TV, a player or the like connected to the network can see the movie or listen to the music.

An apparatus connected by a user having a use right of contents is allowed to access. However, a user not having a use right of contents or the like can easily enter the network having the above-described network configuration. For example, in a network configured by wireless LAN, a theft of contents in a server at a home may occur by illegally entering the network by using a communication apparatus in an outdoor area, in a next house or the like. The configuration permitting illegal accesses of this type may result in secret leak and poses an important issue from the management viewpoint of content copyright.

The following configuration which excludes the above-described illegal accesses has been proposed. A list of access-permitted clients is stored, for example, in a server, and when an access request is issued from a client to the server, the server executes a verification process by using the list to exclude an illegal access.

For example, MAC (Media Access Control) address filtering is known which sets an access permission apparatus list of MAC addresses which are physical addresses specific to network-connected apparatuses. In MAC address filtering, access permission MAC addresses are registered beforehand in a router or a gateway isolating an internal network (subnet) such as a home network from an external network, and a MAC address in a received packet is compared with the registered MAC addresses to reject an access from an apparatus having a MAC address not registered. The technology of this type is disclosed, for example, in Patent Document 1 (Japanese Patent Application Publication No. H10-271154).

It is, however, necessary for a registration process for access limitation MAC addresses to check MAC addresses of all apparatuses to be connected to the network, and for an operator to enter the acquired MAC addresses (48 bits) of all apparatuses and form a list. These processes may be performed by a certain manager if a secure environment is required to be configured such as in particular companies, organizations and the like. However, it is not realistic to request a general user to generate and store a MAC list, for example, in a home network environment set at a general home.

An addition process for a new apparatus occurs often in a home network. If a user is required to check and register the MAC address of a new apparatus each time the addition process is executed, feasibility of network configuration is lost.

Configuring a so-called ubiquitous environment is now in general homes. In the ubiquitous environment, a network configuration including not only PCs but also electric home appliances allows an access from any apparatus. With the spread of wireless LANs and the like, a communicable apparatus can easily invade a wireless LAN externally. In these network environments, illegal accesses to network-connected apparatuses are likely to occur, further increasing the possibility of secret information theft, illegal content read and the like through illegal accesses. It is desired under these circumstances that-a proper access control configuration should be realized easily without burdening general users.

DISCLOSURE OF THE INVENTION

The present invention has been made in consideration of the above-described problems, and has an object to provide an information processing apparatus, a server client system and method and a computer program, in which in the configuration of network-connected apparatuses, an access control configuration can be made easily and reliably without forcing a load on a user having a network-connected apparatus.

The present invention has an object to provide an information processing apparatus, a server client system and method and a computer program, in which, for example, an apparatus (server) for receiving a processing request from various network-connected apparatuses (clients) realizes the configuration that the server judges from client identification whether or not the client has a processing request privilege and acknowledges a processing request only from the client having the processing request privilege, to thereby prevent secret leak by excluding the processing request from an unauthorized apparatus and realize a proper management of content copyright.

A first aspect of the present invention resides in an information processing apparatus for executing a process of generating an access control list, characterized by comprising:

a reception unit for receiving a packet from a client that serves as an access requesting apparatus;

a storage unit storing a MAC list in which information of a MAC list for one client is set as registration data for one slot;

a registration permission judgment unit for confirming whether or not there is an empty slot in the MAC list and judging as that a registration is permitted only if there is the empty slot, in a client registration process based on a received packet at the reception unit; and a registration processing unit for acquiring data containing a client MAC address from the received packet and executing a registration process for the MAC list, in accordance with a judgment of the registration permission by the registration permission judgment unit.

Further, according to an embodiment of the information processing apparatus of the present invention, the registration processing unit is characterized by having a configuration such that a sender MAC address contained in a header field of the packet received from the client is acquired and the acquired sender MAC address is adopted as registration information of the MAC list.

Further, according to an embodiment of the present invention, the information processing apparatus is characterized, by further comprising a packet analysis unit for judging whether the packet received from the client is a registration processing request packet or a data processing request packet, and having a configuration such that if the packet received from the client is the registration processing request packet, the registration permission judgment unit executes a registration permission judgment process in accordance with a presence/absence detection process for the empty slot in the MAC address, and the registration processing unit executes a registration process in accordance with the judgment of the registration permission by the registration permission judgment unit.

Further, according to an embodiment of the information processing apparatus of the present invention, the information processing apparatus is characterized by a configuration such that if the packet received, from the client is the data processing packet, the registration permission judgment unit executes the registration permission judgment process in accordance with the presence/absence detection process for the empty slot in the MAC address, and the registration processing unit executes the registration process for the MAC list in accordance with the judgment of the registration permission by the registration permission judgment unit, by acquiring the data containing the client MAC address from the received data processing request packet.

Further, according to an embodiment of the information processing apparatus of the present invention, the information processing apparatus is characterized by further comprising a control unit for executing a close process for the empty slot under a condition that a lapse time from a setting process for the empty slot in the MAC list exceeds a predetermined threshold time.

Further, according to an embodiment of the information processing apparatus of the present invention, the registration permission judgment unit is characterized by a configuration such that the registration permission judgment unit executes a process of judging whether or not a data processing request sequence from the client correctly and reliably executes a sequence in conformity with a UPnP protocol, and the registration processing unit is characterized by a configuration such that the registration processing unit executes the registration process for the MAC list in accordance with a judgment that the data processing request sequence from the client correctly and reliably executes the sequence in conformity with a UPnP protocol, by acquiring the data containing the client MAC address from the received data processing request packet.

Further, according to an embodiment of the information processing apparatus of the present invention, the registration permission judgment unit is characterized by judging whether a content directory service (CDS) request process in the sequence in conformity with the UPnP protocol is executed or not in response to a data processing request from the client, and the registration processing unit is characterized by a configuration such that the registration processing unit executes the registration process for the MAC list in accordance with a judgment that the content directory service (CDS) request process is executed, by acquiring the data containing the client MAC address from the received data processing request packet.

Further, according to an embodiment of the information processing apparatus of the present invention, the registration processing unit is characterized by a configuration such that the registration processing unit executes the registration process for the MAC list by acquiring the MAC address and identification information different from the MAC address stored in the packet received from the client.

Further, according to an embodiment of the information processing apparatus of the present invention, the identification information different from the MAC address is characterized by being identification information of global unique ID information or key information set to a client apparatus.

A second aspect of the present invention resides in an information processing apparatus that serves as a client for executing an access request to a server connected to a network, characterized by comprising:

a control unit for executing a process of generating and transmitting an access control list registration processing request packet explicitly indicating a registration request in a MAC list possessed by the server, by storing own MAC address in header information.

Further, according to an embodiment of the information processing apparatus of the present invention, the control unit is characterized by a configuration such that the control unit executes a process of generating a packet storing the identification information of the global unique ID information or the key information set to the client apparatus, in a process of generating the access control list registration processing request packet.

Further, according to an embodiment of the information processing apparatus of the present invention, the control unit is characterized by a configuration such that the control unit transmits the access control list registration processing request packet by broadcast transmission or multicast transmission.

A third aspect of the present invention resides in a server client system including a server for receiving an access request and a client for executing the access request, characterized in that:

the client has a configuration such that the client executes a transmission process by generating an access control list registration processing request packet storing own MAC address in header information, under a condition of a power-on process of an information processing apparatus or a specific application activation process; and the server has a configuration such that the server receives the access control registration processing request packet from the client, confirms whether or not there is an empty slot in a MAC list which sets information including a MAC address of one client as registration data for one slot, and executes a registration process of registering client information based on the packet in the MAC list, only when there is the empty slot.

Further, according to an embodiment of the client server system of the present invention, the server is characterized by a configuration such that the server executes a process of acquiring a sender MAC address contained in a header filed on a packet received from the client and adopting the acquired sender MAC address as registration information for the MAC list.

A fourth aspect of the present invention resides in an information processing method of executing a process of generating an access control list, characterized by comprising:

a reception step of receiving a packet from a client that serves as an access requesting apparatus;

a registration permission judgment step of judging whether or not there is an empty slot in a MAC list in which information of a MAC list for one client is set as registration data for one slot; and a registration processing step of acquiring data containing a client MAC address from the received packet and executing a registration process for the MAC list, in accordance with a judgment at the registration permission judgment step that there is the empty slot.

Further, according to an embodiment of the information processing method of the present invention, the registration processing step is characterized by acquiring a sender MAC address contained in a header field of the packet received from the client and adopts the acquired sender MAC address as registration information of the MAC list.

Further, according to an embodiment of the information processing method of the present invention, the information processing method is characterized by further comprising a packet analysis step of judging whether the packet received from the client is a registration processing request packet or a data processing request packet, and in a configuration such that if it is judged at the packet analysis step that the packet received from the client is the registration processing request packet, the registration permission judgment step executes a registration permission judgment process in accordance with a presence/absence detection process for the empty slot in the MAC address.

Further, according to an embodiment of the information processing method of the present invention, if the packet received from the client is the data processing packet, the registration permission judgment step executes the registration permission judgment process in accordance with the presence/absence detection process for the empty slot in the MAC address, and the registration processing unit step executes the registration process for the MAC list in accordance with the judgment of the registration permission by the registration permission judgment unit, by acquiring the data containing the client MAC address from the received data processing request packet.

Further, according to an embodiment of the information processing method of the present invention, the information processing method is characterized by further comprising a control step of executing a close process for the empty slot under a condition that a lapse time from a setting process for the empty slot in the MAC list exceeds a predetermined threshold time.

Further, according to an embodiment of the information processing method of the present invention, the registration permission judgment step is characterized by including a step of judging whether or not a data processing request sequence from the client correctly and reliably executes a sequence in conformity with a UPnP protocol, and the registration processing step is characterized by executing the registration process for the MAC list in accordance with a judgment that the data processing request sequence from the client correctly and reliably executes the sequence in conformity with a UPnP protocol, by acquiring the data containing the client MAC address from the packet received from the client.

Further, according to an embodiment of the information processing method of the present invention, the registration permission judgment step is characterized by including a step of judging whether a content directory service (CDS) request process in the sequence in conformity with the UPnP protocol is executed or not in response to a data processing request from the client, and the registration processing step is characterized by executing the registration process for the MAC list in accordance with a judgment that the content directory service (CDS) request process is executed, by acquiring the data containing the client MAC address from the packet received from the client.

Further, according to an embodiment of the information processing method of the present invention, the registration processing step is characterized by executing the registration process for the MAC list by acquiring the MAC address and identification information different from the MAC address stored in the packet received from the client.

Further, according to an embodiment of the information processing method of the present invention, the identification information different from the MAC address is characterized by being identification information of global unique ID information or key information set to a client apparatus.

A fifth aspect of the present invention resides in an information processing method for an information processing apparatus that serves as a client for executing an access request to a server connected to a network, characterized by comprising:

a trigger detection step of detecting as trigger information a power-on process of the information processing apparatus or a specific application activation process; and a packet generation and transmission process step of generating and transmitting an access control list registration processing request packet explicitly indicating a registration request in a MAC list possessed by the server, under a condition that the trigger information is detected, by storing own MAC address in header information.

Further, according to an embodiment of the information processing method of the present invention, the packet generation and transmission process step is characterized by executing a process of generating a packet storing the identification information of the global unique ID information or the key information set to the client apparatus, in a process of generating the access control list registration processing request packet.

Further, according to an embodiment of the information processing method of the present invention, the packet generation and transmission process step is characterized by transmitting the access control list registration processing request packet by broadcast transmission or multicast transmission.

A sixth aspect of the present invention resides in a computer program for executing a process of generating an access control list, characterized by comprising:

a reception step of receiving a packet from a client that serves as an access requesting apparatus;

a registration permission judgment step of judging whether or not there is an empty slot in a MAC list in which information of a MAC list for one client is set as registration data for one slot; and a registration processing step of acquiring data containing a client MAC address from the received packet and executing a registration process for the MAC list, in accordance with a judgment at the registration permission judgment step that there is the empty slot.

A seventh aspect of the present invention resides in a computer program for executing an information processing method for an information processing apparatus that serves as a client for executing an access request to a server connected to a network, characterized by comprising:

a trigger detection step of detecting as trigger information a power-on process of the information processing apparatus or a specific application activation process; and a packet generation and transmission process step of generating and transmitting an access control list registration processing request packet explicitly indicating a registration request in a MAC list possessed by the server, under a condition that the trigger information is detected, by storing own MAC address in header information.

According to the configuration of the present invention, the MAC list registration processing request packet is automatically transmitted by using as a trigger either a power-on process of the power source of a client apparatus connected to the network or an activation process of a specific application, e.g., an execution application for services using a home network. On the server side, information such as a MAC address is acquired from the received packet and registered, in accordance with the state of an empty slot in the MAC list. It is therefore possible to generate the MAC list as the access control list easily and efficiently without burdening a user.

Further, according to the configuration of the present invention, if the registration processing request packet is not received before a lapse of a threshold time after an empty slot is set to the MAC list of the server, the close process for the empty slot in the MAC list is executed. Therefore, the empty slot in the MAC list is not maintained for a long time and the registration process is not executed erroneously even if the server receives the registration request from the third party. It is therefore possible to prevent an unauthorized data processing request from being acknowledged.

Further according to the configuration of the present invention, the server side executes a process of registering a client still not registered, in response to an ordinary data processing request received from a client. It is therefore possible to register the client in the MAC list without using the registration processing request packet.

Further according to the configuration of the present invention, even if the client is an apparatus unable to transmit a packet in conformity with a specific network access control (SNAC) and is a Universal Plug and Play (UPnP) compliant apparatus, the client can be automatically registered in the MAC list if the sequence in conformity with the UPnP protocol is executed correctly and reliably, so that the MAC list can be generated without burdening a user.

Further, according to the configuration of the present invention, a global unique ID GUID or unique key information data set to an apparatus is stored as registration information of the MAC list, and the server received the data processing request executes client recognition by using not only the MAC address but also the identification data such as GUID and key information. High level security management can therefore be realized.

The computer program of the present invention can be supplied to, for example, a general computer system capable of executing various program codes, in the computer readable format, by storage media and communication media such as a CD, an FD and an MO as the storage media, and a network as the communication media. By supplying the computer program in the computer readable format, processes corresponding to the program can be realized on the computer system.

Other objects, features and advantages of the present invention will become apparent from the more detailed description when read with the embodiments of the present invention to be described later and the accompanying drawings. In this specification, a system is a plurality of configurations of apparatus logical collection, and is not limited to a system that apparatuses of each configuration are accommodated in the same housing.

BRIEF DESCRIPTION OF THE DRAWINGS

FIG. 4 is a diagram showing an example of the structure of a MAC list.

FIG. 7 is a diagram illustrating MAC list registration request data.

BEST MODE FOR CARRYING OUT THE INVENTION

In the following, with reference to the accompanying drawings, detailed description will be made on an information processing apparatus, a server client system and method and a computer program.

[System Outline and MAC List]

Figure 1:
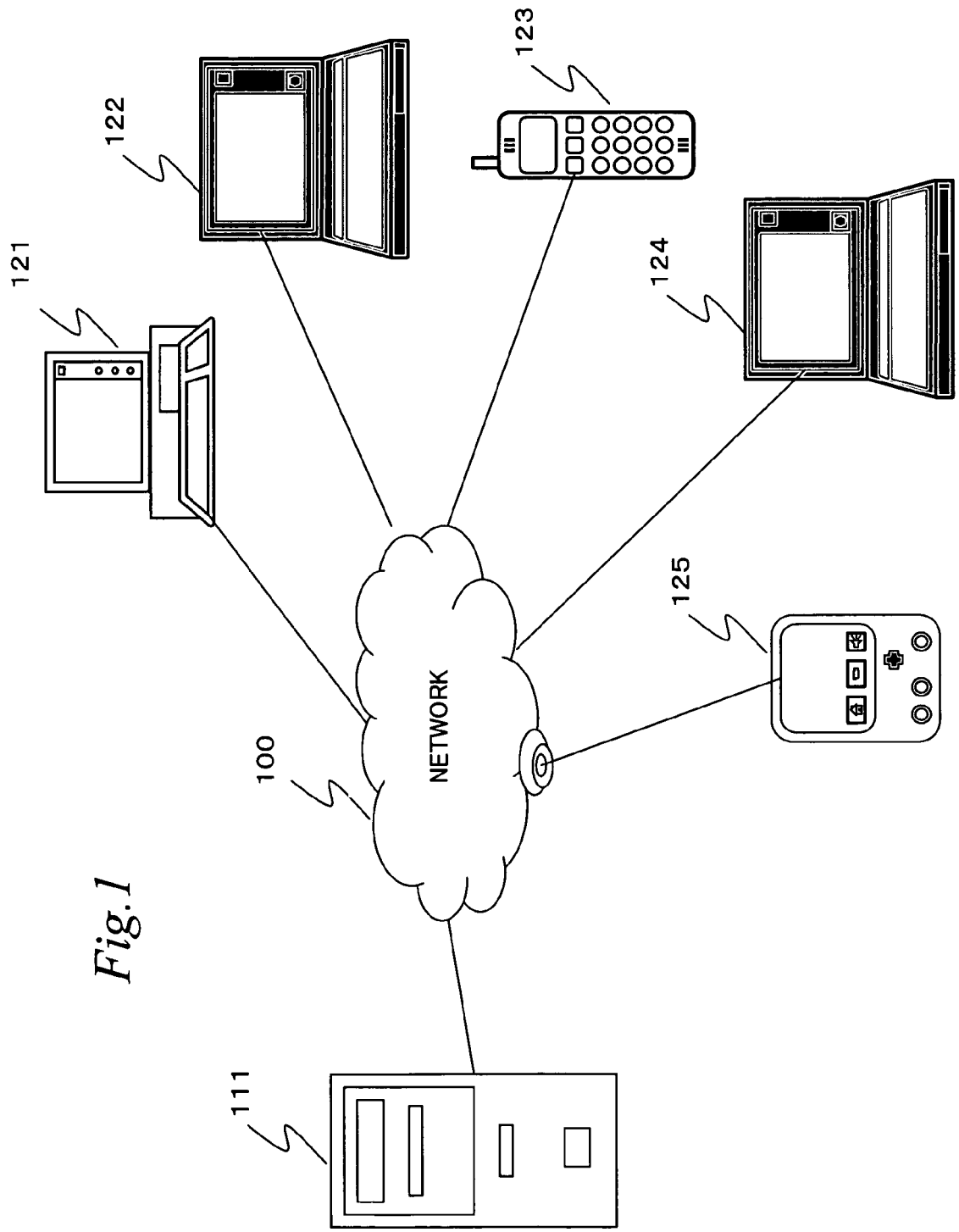
FIG. 1 is a diagram showing an example of a network configuration applicable to the present invention.

First, with reference to FIG. 1, description will be made on an example of a network configuration applicable to the present invention. FIG. 1 shows the configuration, e.g., a home network configuration in which a network 100 interconnects a server 101 for executing a process corresponding to a processing request from each of various client apparatuses, and client apparatuses for issuing a processing request to the server 101, including PCs 121, 122, 124 and portable communication terminals 123 and 125 such as a PDA and a portable phone.

The process to be executed by the server 101 in response to a request from a client includes, for example, a supply of contents stored in a storage means such as a hard disc possessed by the server 101, data processing services through execution of server executable application programs, and the like. In FIG. 1, the server 101 is shown by discriminating it from other client apparatuses: PCs 121, 122, 124 and portable communication terminals 123 and 125 such as PDA and a portable phone. Although the server apparatus provides services corresponding to the request from the clients, any client apparatus may provide a server function if its own data processing service is provided to other clients. Therefore, each client apparatus connected to the network shown in FIG. 1 may become a server.

The network 100 is a wired network, a wireless network or the like, and each network-connected apparatus has a MAC (Medial Access Control) address. Each network-connected apparatus receives/transmits via the network 100 a packet having a destination MAC address and a sender MAC address as header information, e.g., an Ethernet (registered trademark) frame. Namely, each client issues a data processing request to the server 101, by transmitting to the server 101 an Ethernet frame storing processing request information in a data field. Upon reception of the processing request frame, the server 101 executes an access privilege judgment process to be described later, executes data processing if it is judged that the privilege exists, and when necessary stores the data processing result in the data field of an Ethernet frame and transmits it to the client.

Network-connected apparatuses are constituted of, for example, UPnP (Universal Plug and Play) compliant apparatuses. This configuration facilitates addition and deletion of an apparatus with respect to the network. An apparatus to be newly added to the network can receive services from the network-connected apparatuses by executing the following processes:

(1) An addressing process of acquiring its own device ID such as an IP address.

(2) A discovery process of searching each device on a network and receiving a response from each device to, acquire information such as a device type and a function contained in the response.

(3) A service request process of requesting each device for services in accordance with the information acquired by the discovery process.

Figure 2:
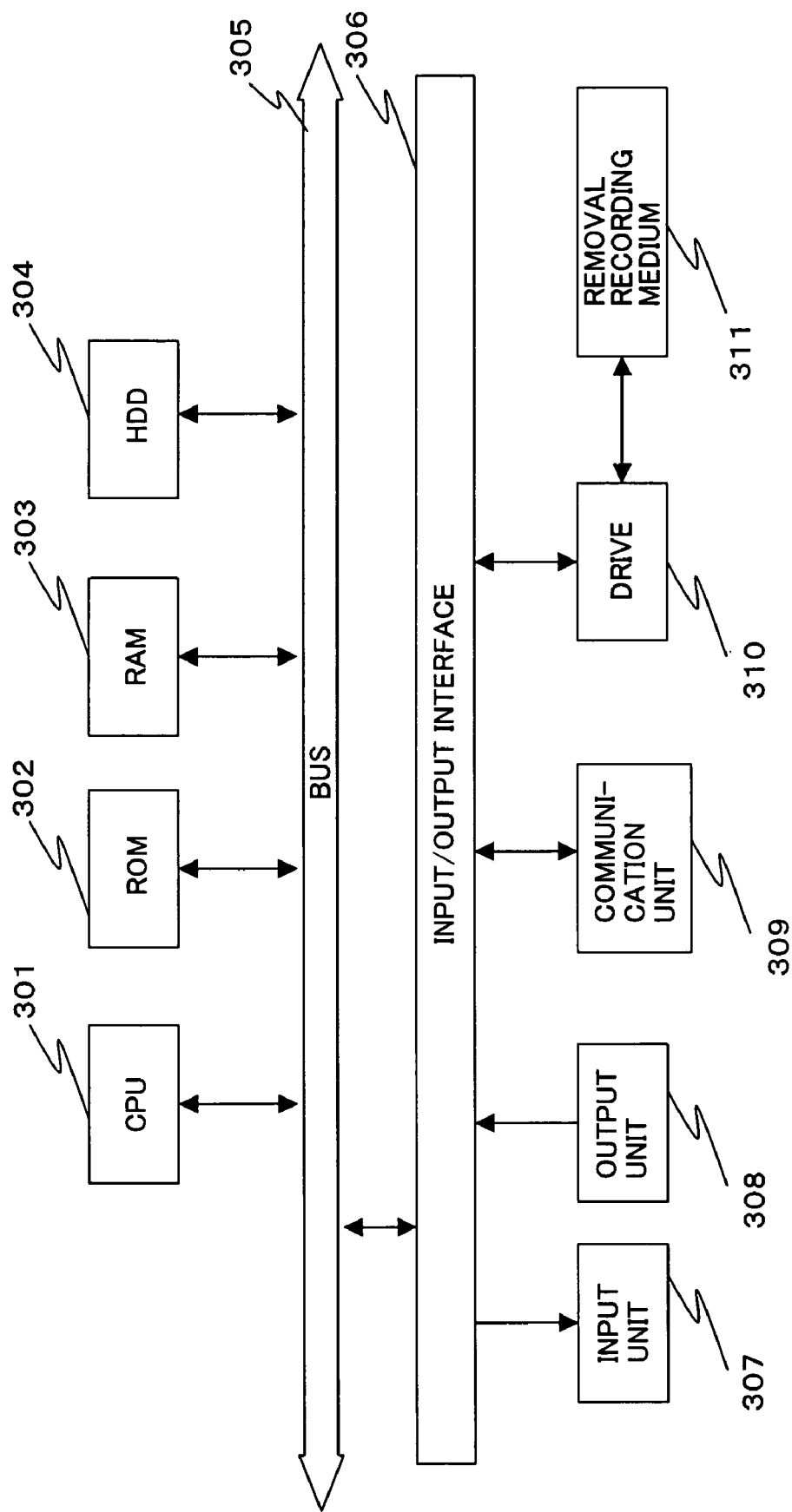
FIG. 2 is a diagram showing an example of the structure of a network-connected apparatus.

With reference to FIG. 2, description will be made on an example of the hardware structure of an information processing apparatus such as PC constituting the server and client apparatuses shown in FIG. 1.

A CPU (Central Processing Unit) 301 executes various processes in accordance with a program stored in a ROM (Read Only Memory) 302, a HDD 304, or the like, and functions as a data processing means or a communication control means. RAM 303 stores the program to be executed by CPU 301 and data if appropriate. A bus 305 interconnects CPU 301, ROM 302, RAM 303 and HDD 304.

An input/output interface 306 is connected to the bus 305. An input unit 307 and an output unit 308 are connected to the input/output interface 306, the input unit being constituted of a keyboard, switches, buttons, mouse or the like to be operated by a user, and the output unit being constituted of an LCD, a CRT, a speaker or the like to present information to a user. Al communication unit and 309 functioning as a data transmission/reception means and a drive 310 are also connected to the input/output interface. The drive 310 can mount a removable recording medium 311 such as a magnetic disc, an optical disc, a magneto optical disc and a semiconductor memory, and executes a data read/write process for the removable recording medium 311.

The structure shown in FIG. 2 is an example of a server and a personal computer (PC) as an example of the network-connected apparatus shown in FIG. 1. The network-connected apparatus is not limited only to PC but it may be a portable communication terminal such as a portable phone and a PDA shown in FIG. 1, other various electronic apparatuses and information processing apparatuses. The hardware structure specific to each apparatus can be used, and the processes matching the hardware are executed.

In the present invention, a network-connected apparatus which performs an access control generates a MAC list as an apparatus list registering MAC addresses of network-connected apparatuses having an access privilege. Although there is a conventional access limitation configuration using a MAC list, it is necessary for a user to check the MAC address of each network-connected apparatus and generate a list by entering the checked addresses.

In the configuration of the present invention, this process by the user is not necessary, but the network-connected apparatus which performs the access control generates automatically the MAC list in accordance with a packet received from each network-connected apparatus.

Figure 3:
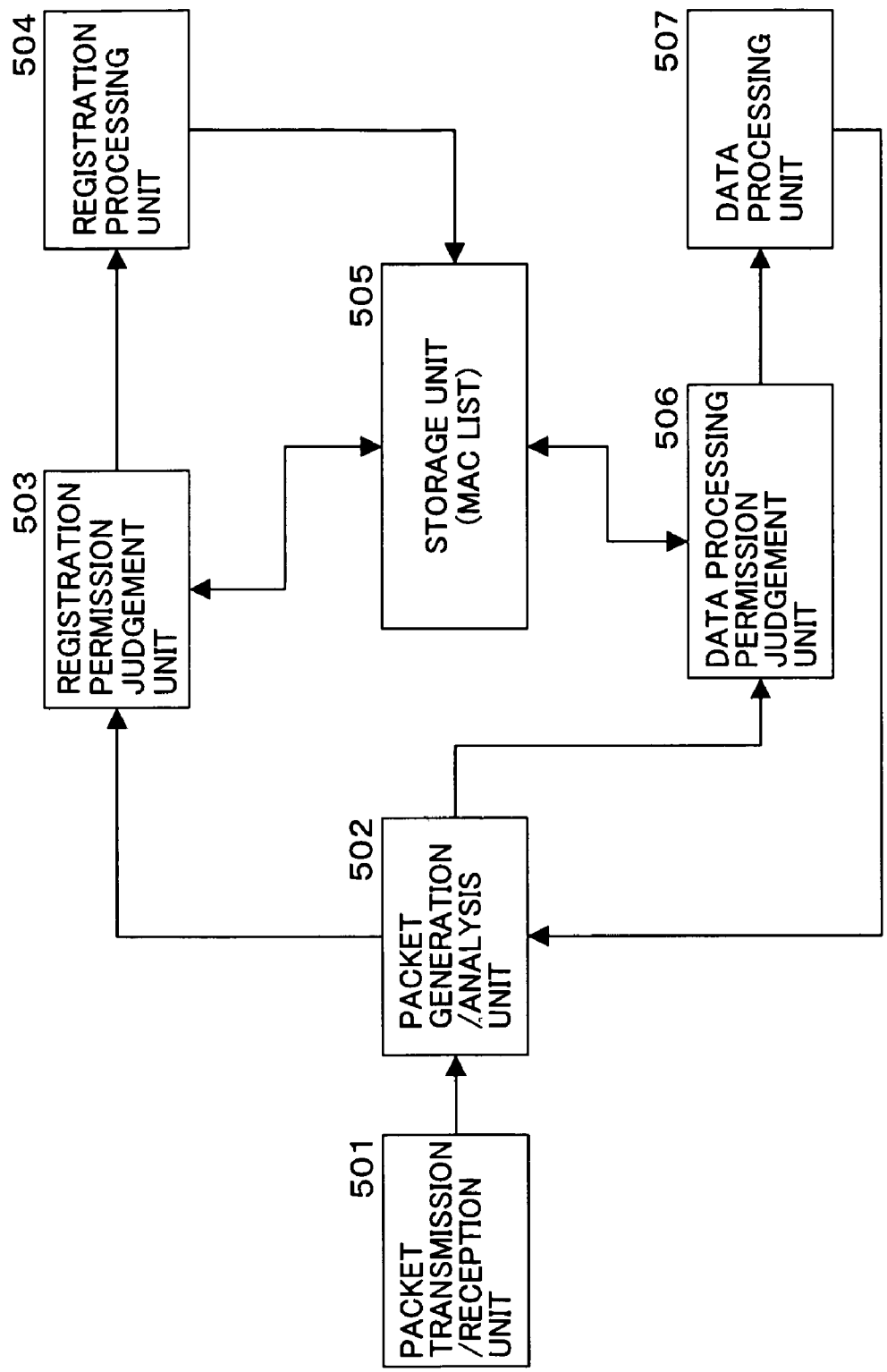
FIG. 3 is a block diagram illustrating the processing function of a server.

FIG. 3 is a block diagram illustrating the processing function of a network-connected apparatus (server) which performs the access control. The server has: a packet transmission/reception unit 501 for transmitting/receiving a packet via the network; a packet generation/analysis unit 502 for generating a packet to be transmitted from the packet transmission/reception unit 501 and analyzing a packet received from the packet transmission/reception unit 501; a registration permission judgment unit 503 for judging from a packet received from a client whether or not the registration to the MAC list is permitted; a registration processing unit 504 for executing a registration process in accordance with a judgment made by the registration permission judgment unit 503; a storage unit 505 storing the MAC list; a data processing permission judgment unit 506 for judging whether or not the data processing execution is permitted or not, in accordance with whether or not a data processing request client is registered in the MAC list, which is judged from each of various data processing request packets sent to the server; and a data processing unit 507 for executing the data processing requested by the client, under the condition of a data processing permission judgment by the data processing permission judgment unit.

FIG. 4 shows an example of the structure of the MAC list as an access control list stored in the network-connected apparatus (server) which performs the access control.

The MAC list is stored in a storage unit (non-volatile memory) in the server. The MAC list has the structure that registration data of each client is stored in the slot unit base, information of one registration client being stored in one slot.

The registration information includes a MAC address of a client, a client name which a user can set as desired and a registration time and data. As options, identification data different from the MAC address may be stored, e.g., a unique identifier such as a GUID (Global Unique Identifier), key data set to a client apparatus, or the like. The stored data is data contained in the packet (Ethernet frame) transmitted from each client in the registration process. The server acquires registration information in the packet (Ethernet frame) transmitted from a client and executes the registration process for the MAC list.

Figure 5:
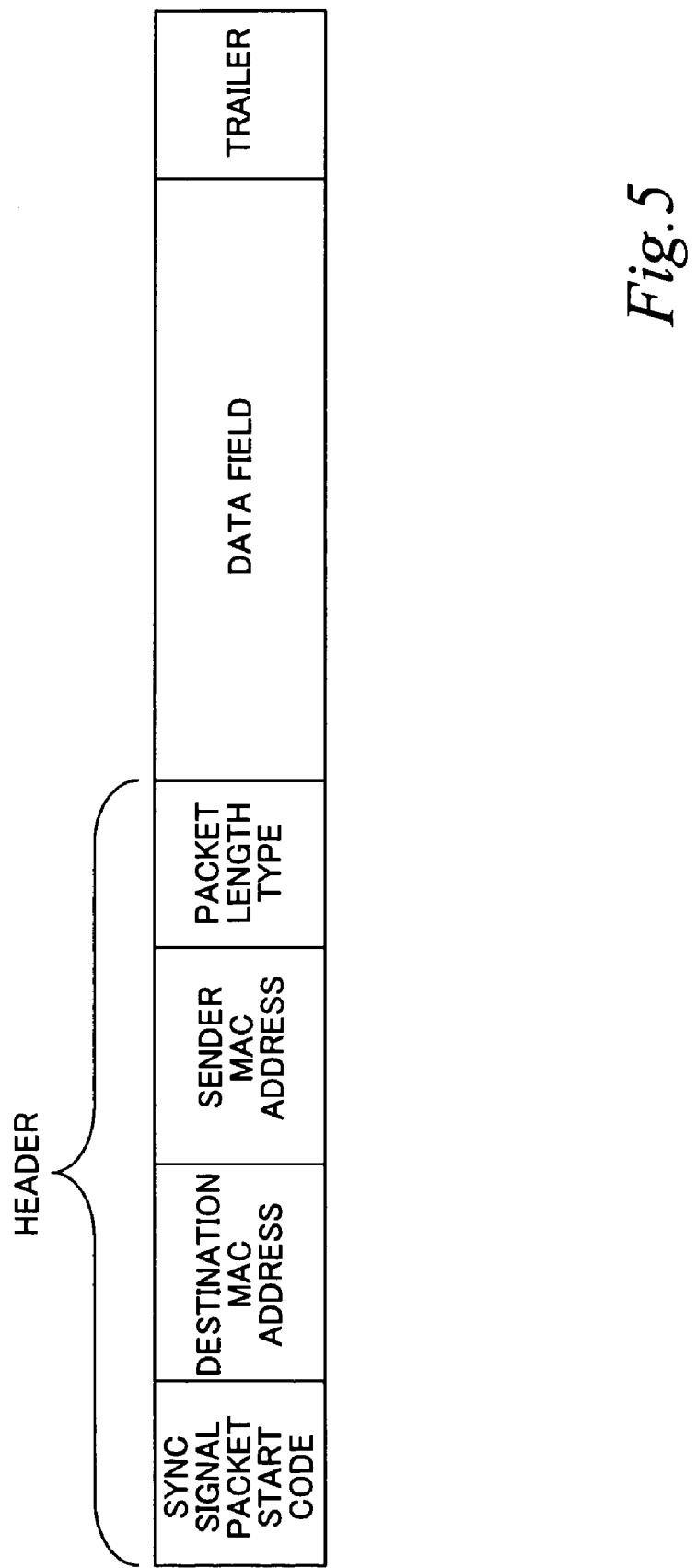
FIG. 5 is a diagram showing the format of an Ethernet frame.

FIG. 5 shows the format of an Ethernet frame. The Ethernet frame is partitioned into a header field, a data field and a trailer field. The header field contains a sync signal, a packet start code, a destination MAC address, a sender MAC address, a packet length and a packet type.

The data field contains data generated in conformity with, for example, the TCP/IP communication protocol, and stores, for example, an IP packet containing sender/destination addresses. The MAC address information of the registered data in the MAC list shown in FIG. 4 is acquired from the sender MAC address set to the header field of the Ethernet frame shown in FIG. 5, whereas other information is acquired from the data stored in the data field. This information is received at the server for executing the registration process, i.e., the server received the Ethernet frame (packet), which in turn reads necessary information from the packet to execute the registration process for the MAC list.

As described earlier, information of one client is stored in one slot of the MAC list shown in FIG. 4. The number of slots may be set as desired by a user. When the client information is registered at the server, it is checked whether or not there is an empty slot, and if there is an empty slot, the client information can be registered newly. In the example shown in FIG. 4, the number of set slots is three #1 to #3. The slot number #4 and subsequent slots are in a close state so that three clients at the maximum can be registered.

When a user executes the registration process by connecting a new client to the network, an empty slot is generated in the MAC list of the server. In the state shown in FIG. 4, the slots with slot Nos. #1 and #2 are already registered, the slot with slot No. #3 is set as an empty slot, and only one client can be newly registered in the slot with slot No. #3. The configuration may be adopted in such a way that, after an empty slot is set, the empty slot may be automatically closed. This structure is to prevent illegal registration by a third party apparatus not anticipated by a user. This process will be later described.

[Client Registration Process for MAC List]

Next, with reference to the process flow shown in FIG. 6, description will be made on the basic sequence of the registration procedure for the MAC list by a client.

The left side shows the client process of executing a registration request for the MAC list, and the right side shows the server process of executing the registration process for the MAC list upon reception of the registration request from the client.

At Step S111 as the client executes either a process of turning ON the power of an apparatus or a process of activating a predetermined application such as an execution application for services using a home network, by using this process as a trigger a registration processing request packet is automatically transmitted to the server at Step S112.

Namely, in accordance with a program stored in a storage unit, the control unit, i.e., CPU 301 in the hardware structure example shown in FIG. 2, of the information processing apparatus as the client detects one of the process of turning ON the power of an apparatus or the process of activating a predetermined application such as an execution application for services using a home network. By using this detection information as a trigger, the registration processing request packet, i.e., an access control list registration processing request packet having a MAC address in the header and explicitly indicating the registration request for the MAC list possessed by the server, is generated and automatically transmitted to the server.

FIG. 7 shows an example of the main structure of a data field of message data to be transmitted when the registration request is issued. "B-POST*HTTP/1.1" indicates that the message format is Ver.1.1 of HTTP. "HOST: 192. 254. 255: 3536" indicates a broadcast host IP address and a port number. "Content-Type: application/ . . . " and "Content-Length: 65" indicate a content type and a content length. "Broadcast SNAC" indicates broadcast transmission in conformity with a specific network access control (SNAC). "Method: Register" indicates that an execution method to be executed for the packet is a registration method.

In addition to the above-described data, the client name, ID information such as GUID, key information or the like contained in the registration data of the MAC list shown in FIG. 4 may be included in the data field. Data to be stored in the packet which is transmitted for the registration process may be defined in accordance with which data is to be stored in the MAC list on the server side. The client executes a process of generating and transmitting the registration processing request packet storing the data matching the definition information, in response to turning on the power of the apparatus or activating an execution application for services using a home network.

Figure 6:
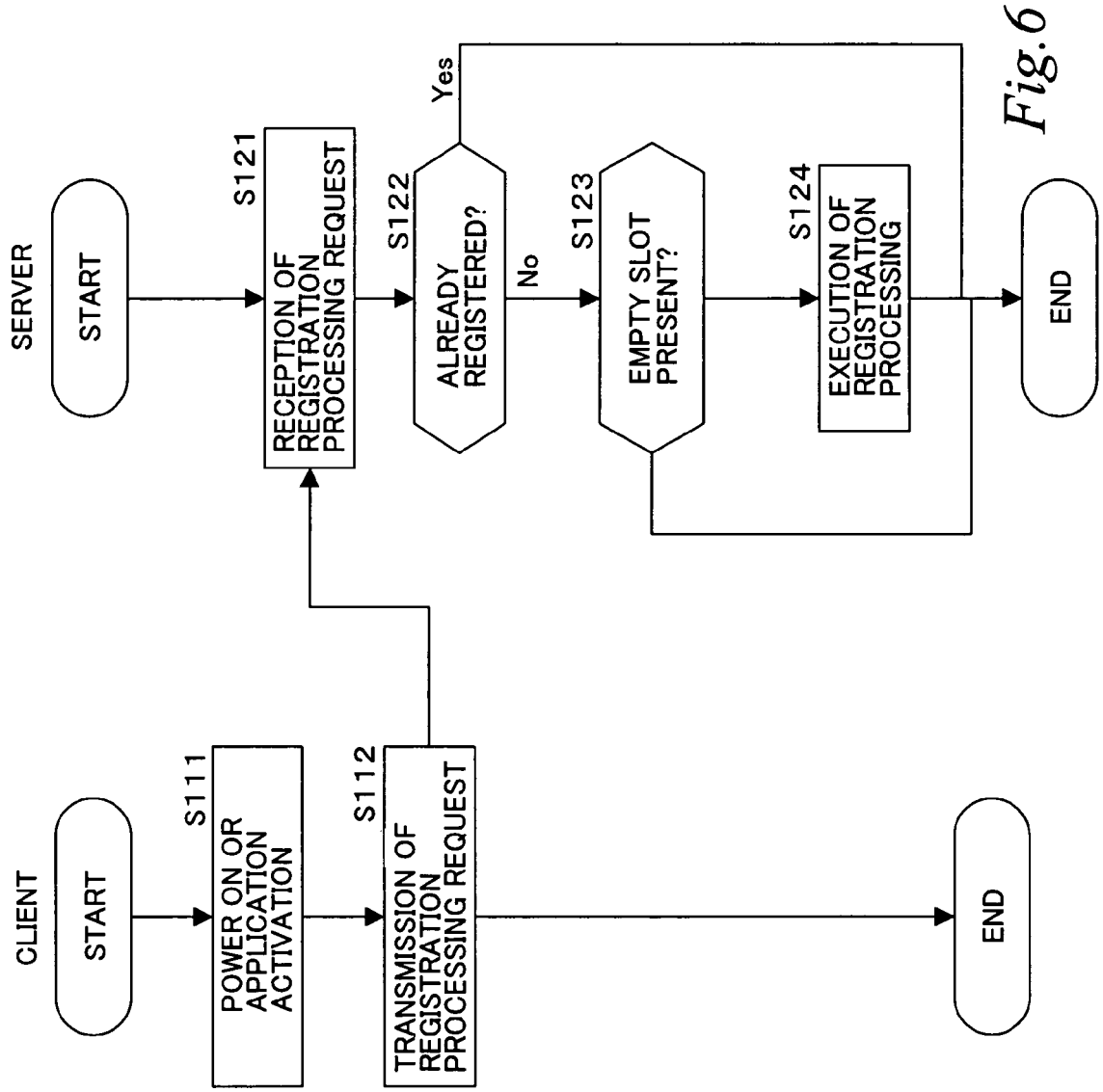
FIG. 6 is a flow chart illustrating a client registration processing sequence for the MAC list.

Reverting to the process flow shown in FIG. 6, description continues on the client information registration sequence for the MAC list. A Step S121 the packet transmission/reception unit 501 shown in FIG. 3 receives the registration processing request packet containing the above-described data transmitted from the client, and the packet generation/analysis unit 502 analyzes the packet to judge that the packet is the registration processing request packet, and the registration permission judgment unit 503 judges whether or not the registration is permitted.

At Step S122 the server refers to the MAC list in its storage unit 505 to judge whether or not the data corresponding to the sender MAC address contained in the received packet is already registered, and if it is judged that the data is already registered, the process is terminated. In this case, the configuration may be adopted to execute a process of transmitting to the client side a response message notifying that the data is already registered.

If it is judged at Step 5122 that the data corresponding to the sender MAC address contained in the received packet is not registered in the MAC list in its storage unit 505, then at Step S123 it is judged whether or not there is an empty slot capable of registering data in the MAC list. If there is no empty slot, the process is terminated because the registration process for a new client cannot be executed. In this case, the configuration may be adopted to execute a process of transmitting to the client side a response message notifying registration inability.

If it is judged at Step S123 that the MAC list has an empty slot capable of registering data, then at Step S124 the registration processing unit 504 shown in FIG. 3 executes a process of acquiring the sender MAC address in the header field and the registration information in the data field respectively contained in the registration processing request packet received from the client, and registers them in the empty slot of the MAC list.

With the above processes, the registration process of registering the client in the MAC list by the server is completed.

The client registered in the MAC list transmits the data processing request to the server by using a packet such as the already described Ethernet frame (refer to FIG. 5). The data processing permission judgment unit 506 (refer to FIG. 3) of the server acquires the sender MAC address from the header information of the Ethernet frame, and compares it with the registration information in the MAC list stored in the storage unit 505. If it coincides with the registered MAC address, the data processing unit 507 executes a request process, e.g., provides contents or the like.

If the sender MAC address in the header information of the data processing request frame received from the client is not registered in the MAC list stored in the storage unit 505, it is judged that the process request was transmitted from an unauthorized client, and the request process of the client will not be executed.

The registration process of registering the client in the MAC list described with reference to FIG. 6 is basically as an automatic registration process of automatically registering the client information if there is an empty slot. Instead, the configuration may be adopted to execute a process of registering the client information in the MAC list after a user judges whether or not the registration is permitted. In this case, a user judgment Step is executed between Steps S123 and S124 in the process Steps shown in FIG. 6. For example, packet information received at the server is displayed on a display, and only when a user judges that the registration is permitted, in accordance with the displayed information, a registration execution command is input from an input means to register the client information in the MAC list under the condition that the user inputs the registration execution command. With this configuration, a securer registration process becomes possible.

[Automatic Close Process for Empty Slot]

Next, description will be made on a process of setting an empty slot in the MAC list and closing the empty slot, to be executed by the server storing the MAC list. As described earlier, the MAC list is set in the storage unit of the server in the slot unit base, each slot storing information of one client.

The process of setting an empty slot and closing the empty slot can be executed by a user. If the empty slot is set and maintained for a long time and the above-described automatic registration process without user confirmation is executed, there is a possibility of an unauthorized registration process by a third party. In order to inhibit this situation, a process is executed which automatically closes the set empty slot after a lapse of a threshold time. Namely, the control unit of the server storing the MAC list measures a lapse time from when an empty slot is set to the MAC list, and executes a close process under the condition that the measured time exceeds a preset threshold time.

Figure 8:
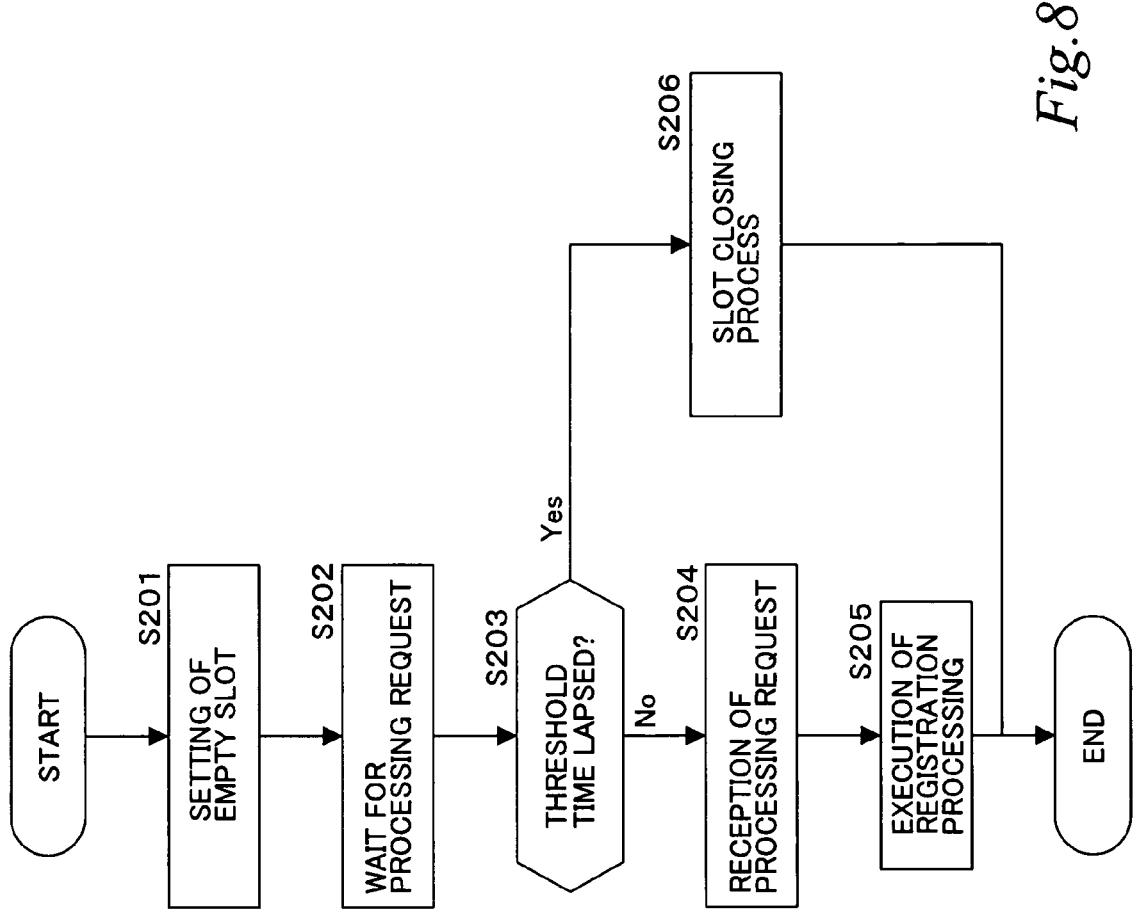
FIG. 8 is a flow chart illustrating a slot setting close process for the MAC list.

With reference to the flow shown in FIG. 8, description will be made on the process of setting an empty slot and automatically closing the empty slot. At Step S201 a user sets an empty slot to the MAC list. In general, when a user connects a new client apparatus or apparatuses to the network, the user sets empty slots corresponding in number to the number of apparatuses to be newly connected. By setting only the necessary number of slots and not setting unnecessary empty slots, only the apparatuses managed by the user can be registered in the MAC list.

After an empty slot is set at Step S201, the server waits for a registration processing request packet. This packet is the same as the registration processing request packet from the client described with reference to the flow shown in FIG. 6, and the packet automatically transmitted, for example, in response to power ON by the client or application activation.

The server measures a lapse time from when the empty slot is set at Step S201, and at Step S203 the lapse time is compared with a preset threshold time. If the registration processing request packet is received from the client before the threshold time at Step 204, then at Step S205 the server acquires the registration information such as a MAC address from the registration processing request packet and executes a process of registering the acquired registration information in the empty slot of the MAC list.

If the registration processing request packet is not received from the client before the threshold time, the flow advances to Step S206 whereat the close process for the empty slot in the MAC list is executed. With this close process, it becomes that no empty slot exists in the MAC list. Therefore, even if the server receives a registration request from the third party, the registration process will not be executed erroneously so that it is possible to prevent an unauthorized data processing request from being acknowledged.

[Registration Process Responsive to Data Processing Request]

The registration process of registering a new client in the MAC list described earlier with reference to FIG. 6 is executed when the server receives the registration processing request packet requesting for a registration process. The configuration may be adopted to not only execute a process of registering client information in the MAC list in response to this explicit registration response, but also makes the server automatically register a client in the MAC list when a general data processing request is received from the client, e.g., a content acquisition request packet for video data, music data or the like stored in a storage means of the server.

In the following, with reference to the flow shown in FIG. 9, description will be made on a procedure of registering a data processing request client in the MAC list in response to a general data processing request from the client received at the server.

First, upon reception of a registration processing request packet or a data processing request packet from a client at Step S301, at Step S302 the server judges whether or not the received packet is a registration processing request packet or a data processing request packet.

If the received packet is the registration processing request packet, it is judged at Step S303 whether or not there is an empty slot in the MAC list. If there is an empty packet, registration information is acquired from the received packet to thereafter execute the registration process. These processes correspond to the processes described with reference to FIG. 6.

On the other hand, if it is judged in the packet type judgment process at Step S302 that the received packet is the data processing request packet, then it is judged at Step S305 whether or not the sender MAC address contained in the header information of the data processing request packet is already registered in the MAC list stored in the storage unit. This process is executed by the data processing permission judgment unit 506 shown in FIG. 3.

If the sender MAC address is already registered in the MAC list, it means that the data processing request was transmitted from the registered client. Therefore, a process corresponding the request is executed at Step S306. This data processing is executed by the data processing unit 507 shown in FIG. 3.

If it is judged at Step S305 that the sender MAC address contained in the header information of the data processing request packet is not registered in the MAC list stored in the storage unit, then it is judged at Step S307 whether or not there is an empty slot in the MAC list. If there is an empty slot, at Step S308 registration information such as the sender MAC address is acquired from the received packet to thereafter execute the registration process. After the registration, at Step S306 the client request process is executed to thereafter terminate the process.

With the above-described configuration that the server executes a process of registering a client still not registered in response to the general data processing request received from a client, the client can be registered in the MAC list without involving a special registration processing request packet transmission/reception process.

Figure 9:
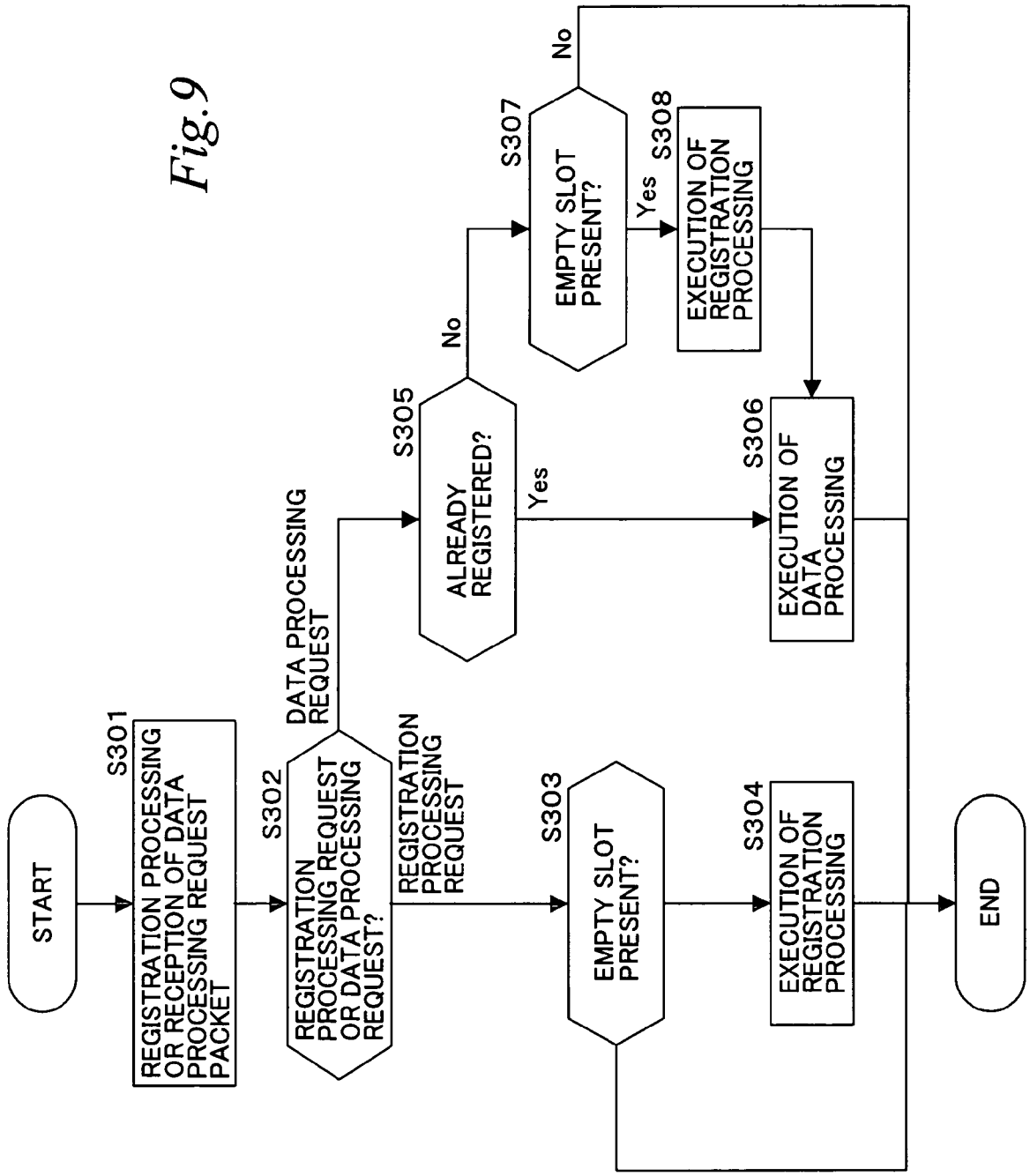
FIG. 9 is a flow chart illustrating a registration process for the MAC list in response to a data processing request.

In the above description, the registration process of registering client information in the MAC list described with reference to FIG. 9 is basically an automatic registration process if there is an empty slot. Similar to the process responsive to the registration processing request packet described previously with reference to FIG. 6, the configuration may be adopted to execute the MAC list registration process after a user judges whether or not the registration is permitted. In this case, a user judgment Step is executed between Steps S307 and S308 in the process Steps shown in FIG. 9. For example, packet information received at the server is displayed on a display, and only when a user judges that the registration is permitted, in accordance with the displayed information, a registration execution command is input from an input means to register the client information in the MAC list under the condition that the user inputs the registration execution command. With this configuration, a securer registration process becomes possible.

[Registration Process for UPnP Protocol Compliant Packet]

When the server executes the MAC list registration process in response to the registration processing request packet or data processing request packet from a client, the server is required to recognize that the registration processing request packet or data processing request packet from a client is a packet in conformity with a specific network access control (SNAC). Therefore, for an apparatus unable to transmit a packet in conformity with the specific network access control (SNAC), the above-described MAC list registration process responsive to a received packet is impossible.

As described earlier, Universal Plug and Play (UPnP) compliant simple apparatuses capable of network connections are often connected to a home network or the like. A number of UPnP compliant apparatuses are manufactured by a variety of makers and exist already.

In the following, description will be made on an example of the configuration which allows a MAC list automatic registration of an UPnP compliant apparatus unable to transmit a packet in conformity with the specific network access control (SNAC).

In this embodiment, the server analyzes a process to be executed in accordance with a packet received from a client and judges whether or not the sequence following the UPnP protocol is executed correctly and reliably. Under the judgment condition that the sequence following the UPnP protocol is executed correctly and reliably, the MAC list registration process of the UPnP compliant apparatus is executed. As the judgment condition, the condition such that the sequence following a UPnP AV protocol is executed correctly and reliably may be adopted. In this case, registration from lighting equipments can be excluded, the lighting equipments being supposed to have a possibility of mounting the UPnP protocol and not to mount the UPnP AV protocol.

Figure 10:
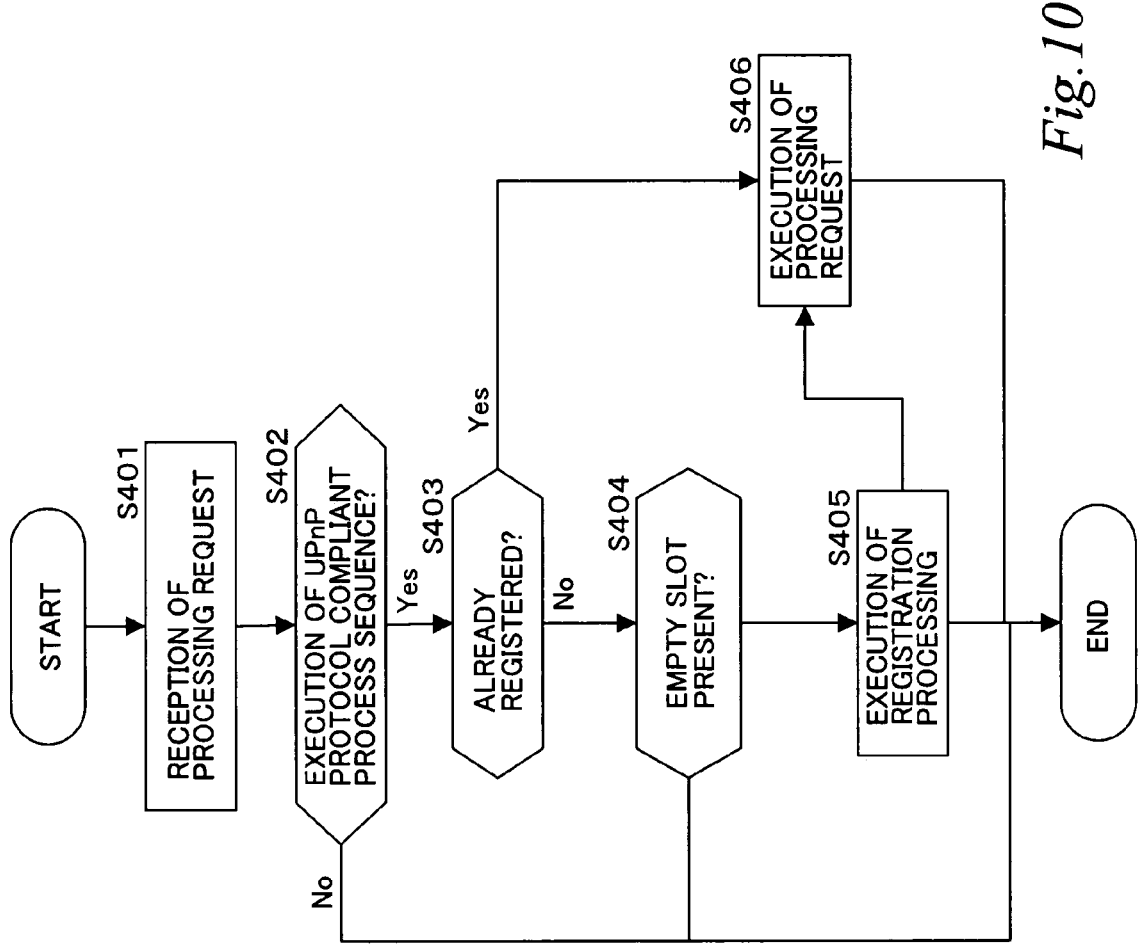
FIG. 10 is a flow chart illustrating the registration process for the MAC list under the condition that the processing sequence is executed in accordance with a UPnP protocol.

FIG. 10 is a flow chart illustrating the process sequence by the server according to this embodiment. At Step S401 the server receives a processing request packet from a client, and judges at Step S402 whether or not the process sequence following the UPnP protocol is executed correctly and reliably.

As described earlier, the process sequence following the UPnP protocol is constituted fundamentally of the following steps.

(1) An addressing process of acquiring its own device ID such as an IP address.

(2) A discovery process of searching each device on a network and receiving a response from each device to acquire information such as a device type and a function contained in the response.

(3) A service request process of requesting each device for services in accordance with the information acquired by the discovery process.

If these process steps are executed correctly and reliably, the server judges that the client apparatus is compliant with the authorized UPnP and that the apparatus can be registered in the MAC list. If the above-described processes (1) to (3) are not executed, the server judges that the apparatus is not permitted to be registered (S402:NO) to terminate the process.

If it is judged that the above-described process steps are executed correctly and reliably and that the client apparatus is compliant with the authorized UPnP, then it is judged at Step S403 whether or not the sender MAC address contained in the header information of the data processing request packet is already registered in the MAC list stored in the storage unit. This process is executed by the data processing permission judgment unit 506 shown in FIG. 3.

If the sender MAC address is already registered in the MAC list, the data processing request was transmitted from a registered client. Therefore, at Step S406 the process corresponding to the request is executed. The data processing is executed by the data processing unit 507 shown in FIG. 3.

If it is judged at Step S403 that the sender MAC address contained in the header information of the data processing request packet is not registered in the MAC list stored in the storage unit, then it is judged at Step S404 whether or not there is an empty slot in the MAC list. If there is an empty slot, at Step S405 registration information is acquired from the received packet to execute the registration process. After the registration, at Step S406 the request process of the client is executed to thereafter terminate the process.

According to the embodiment described above, even a client apparatus unable to transmit a packet in conformity with the specific network access control (SNAC) can be automatically registered in the MAC list, if the apparatus is compliant with the Universal Plug and Play (UPnP) and the sequence following the UPnP protocol is executed correctly and reliably. It is therefore possible to generate the MAC list without burdening a user.

Various judgment levels may be set for the server judgment of whether or not the process sequence following the UPnP protocol is executed correctly and reliably. For example, in a server for executing content provision services, the MAC list registration condition is set as the condition that a process up to a content list request process following the UPnP protocol, i.e., a so-called content directory service (CDS) request process, is executed.

Namely, in the server for executing content provision services, if the content list request process following the UPnP protocol, i.e., so-called content directory service (CDS) request process, is executed in the process sequence following the UPnP protocol, then it is judged that the client is to be registered in the MAC list stored in the server, and the registration process is executed. If the content directory service (CDS) request process is not executed, it is judged that the client is not to be registered in the MAC list stored in the server, and the registration process is not executed.

As described above, the MAC list registration is executed under the condition that the UPnP protocol sequence corresponding to the services provided by the server is executed. It is therefore possible to avoid an unnecessary registration process such as registering a client apparatus unnecessary for list registration in the MAC list.

[Authentication Based on Identifier (ID) and Key Information]

As previously described with reference to FIG. 4, in addition to the MAC address, client name and registration time and date, a GUID as a global unique identifier and unique key information data set to an apparatus can be stored as options of the client registration information in the MAC list.

The identification information of this kind other than the MAC address is used for realizing securer management. The MAC address is generally 48-bit data which can be acquired by any general user by checking the apparatus and is not basically secret. It cannot therefore be said that registration of an unauthorized apparatus in the MAC list will not occur. An illegal action may be effected by identity theft of an authorized client apparatus and by using the MAC address of the authorized apparatus as that of an unauthorized apparatus.

High level security management can be realized not by adopting only the 48-bit MAC address having a relatively small data amount as the client confirmation condition data, but by adopting additionally identification data having a larger data amount, data having a small leak possibility, or the like as the client confirmation.

A client which issues a registration request transmits the registration processing request packet or data processing request packet by storing, in its data field, GUID (e.g., data of 128 bits or more) as the global unique identifier or unique key information data set to the apparatus. The server acquires the MAC address, client name and registration time and date as well as GUID or unique key information data set to the apparatus stored in the data field, and sets the acquired data in the MAC list as the registration information.

For the data processing request from a client after the registration, the client generates the data processing request packet storing the registered identification data such GUID and key information and transmits it to the server. The server acquires the MAC address and identification data such as GUID and key information contained in the data processing request packet, and judges whether or not the acquired data coincides with the data registered in the MAC list, and only when the coincidence is confirmed, services are provided.

Figure 11:
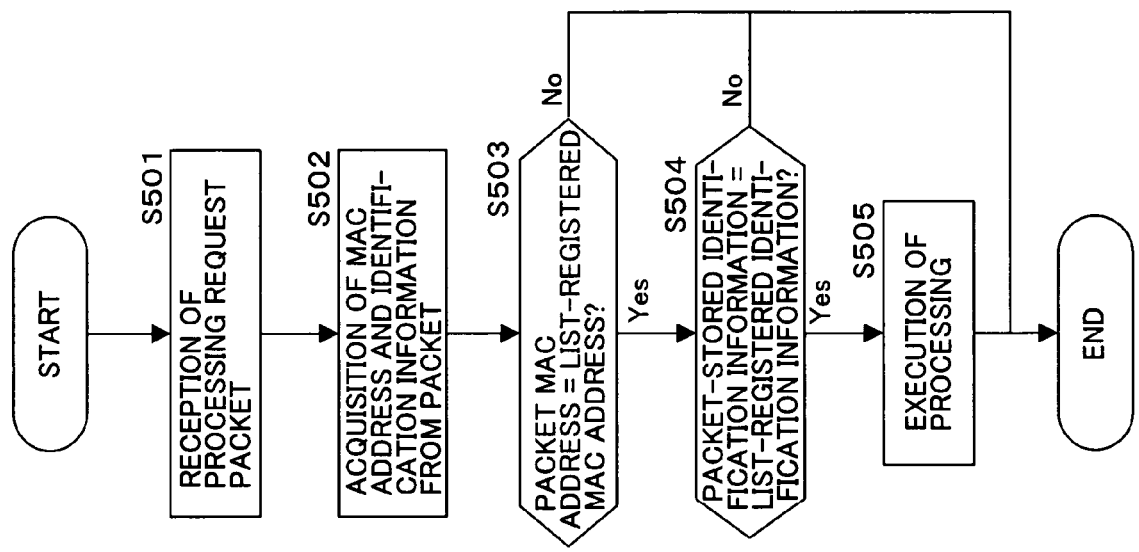
FIG. 11 is a flow chart illustrating the process sequence of the server including a data processing execution permission judgment by a verification process for the MAC address and other identification information.

With reference to FIG. 11, description will be made on a process sequence by the server which executes service provision under the condition of verification of identification information other than the MAC address.

Upon reception of a data processing request packet from a client at Step S501, the sender MAC address set to the header field of the packet and the identification information such as GUID and key information stored in the data field are acquired at Step S502. At Step S503 verification is performed between the sender MAC address set to the header field of the packet and the registration information registered in the MAC list. If there is no coincidence, it is judged that the processing request was transmitted from a client not registered, and the process is terminated without executing the request process.

If verification of the MAC address succeeds because coincident information exists, at Step S504 a verification process is executed between the identification information stored in the data field of the packet and the identification information in the same slot as that storing the verification MAC address in the MAC list.

If there is no coincidence of the identification information, it is judged that the processing request was transmitted from an unauthorized client, and the process is terminated without executing the request process. If there is a coincidence of the identification information, at Step S505 the request process of the client is executed.

With the above-described processes, the server received a data processing request can execute client confirmation by using not only the MAC address but also identification data having a large data amount, data having a small leak possibility or the like. High level security management is therefore possible.

In the above-described embodiment, although the MAC address has been described as client identification information, the client identification information may be information capable of identifying a device, such as an ID of a CPU, a serial number or nickname of a device or the like.

The present invention has been described in detail with reference to specific embodiments. It is obvious that modifications and substitutions of the embodiment can be made by those skilled in the art without departing from the gist of the present invention. Namely, the present invention has been disclosed illustratively and should not be construed limitatively. In order to decide the gist of the present invention, Claims described in the opening should be taken into consideration.

The above-described series of processes described in the specification may be realized by hardware, software or the composite structure of both. If a series of processes are to be realized by software, the program writing the process sequence can be installed in a memory of a computer assembled with dedicated hardware to make the program be executed, or in a general computer capable of executing various processes to make the program be executed.

For example, the program may be recorded beforehand in a hard disc or a ROM (Read Only Memory) as a recording medium. Alternatively, the program may be stored (recorded) temporarily or permanently in a removable recording medium such as a flexible disc, a CD-ROM (Compact Disc Read Only Memory), an MO (Magneto optical) disc, a DVD (Digital Versatile Disc) a magnetic disc and a semiconductor memory. These removable recording media may be supplied as so-called package software.

The program may be installed in a computer from the above-described removal recording medium, or wireless transferred to a computer from a download site, or wired-transferred to a computer via a network such as a LAN (Local Network) and the Internet. The computer receives the program transferred in this manner and installs it in a recording medium such as a built-in hard disc.

Various processes described in the specification may be executed not only time sequentially in the order of written statements but also parallel or independently in accordance with a processing ability of an apparatus executing processes or when necessary. In the specification, a system is a plurality of configurations of apparatus logical collections, and is not limited to a system that apparatuses of each configuration are accommodated in the same housing.

INDUSTRIAL APPLICABILITY

As described so far, according to the configuration of the present invention, the MAC list registration processing request packet is automatically transmitted by using as a trigger either a power-on process of the power source of a client apparatus connected to the network or an activation process of a specific application, e.g., an execution application for services using a home network. On the server side, information such as a MAC address is acquired from the received packet and registered, in accordance with the state of an empty slot in the MAC list. It is therefore possible to generate the MAC list as the access control list easily and efficiently without burdening a user.

Further, according to the configuration of the present invention, if the registration processing request packet is not received before a lapse of a threshold time after an empty slot is set to the MAC list of the server, the close process for the empty slot in the MAC list is executed. Therefore, the empty slot in the MAC list is not maintained for a long time and the registration process is not executed erroneously even if the server receives the registration request from the third party. It is therefore possible to prevent an unauthorized data processing request from being acknowledged.

Further according to the configuration of the present invention, the server side executes a process of registering a client still not registered, in response to an ordinary data processing request received from a client. It is therefore possible to register the client in the MAC list without using the registration processing request packet.

Further according to the configuration of the present invention, even if the client is an apparatus unable to transmit a packet in conformity with a specific network access control (SNAC) and is a Universal Plug and Play (UPnP) compliant apparatus, the client can be automatically registered in the MAC list if the sequence in conformity with the UPnP protocol is executed correctly and reliably, so that the MAC list can be generated without burdening a user.

Further, according to the configuration of the present invention, a global unique ID GUID or unique key information data set to an apparatus is stored as registration information of the MAC list, and the server received the data processing request executes client authentication by using not only the MAC address but also the identification data such as GUID and key information. High level security management can therefore be realized.

The invention claimed is:

1. An information processing apparatus for connecting to a network to which a plurality of devices are connected, and executing a process of generating an access control list, comprising:
    a reception unit configured to receive a packet from a client that serves as an access requesting apparatus through the network;
    a storage unit configured to store a MAC list in which information for one client is set as registration data for one slot, the MAC list including a pre-determined number of empty slots that define openings in the MAC list for additional devices to be granted permission to access the information processing apparatus, the pre-determined number of the empty slots being set to change from empty to closed after a predetermined amount of time has lapsed, a closed slot being a slot on the MAC list that cannot be occupied by any device;
    a registration permission judgment unit configured to confirm whether or not there is an empty slot in the MAC list and to judge that a registration is permitted only if there is the empty slot in the MAC list, in a client registration process based on a received packet at the reception unit;
    a registration processing unit configured to acquire data containing a client MAC address from the received packet and to execute a registration process for the MAC list, in accordance with a judgment of the registration permission by the registration permission judgment unit; and
    a control unit configured to change the pre-determined number of the empty slots from empty to closed in response to the lapse of the predetermined amount of time so that no empty slots exist in the MAC list.

2. The information processing apparatus according to claim 1, wherein
    the registration processing unit is configured to acquire a sender MAC address contained in a header field of the packet received from the client and to adopt the acquired sender MAC address as registration information of the MAC list.

3. The information processing apparatus according to claim 1, further comprising:
    a packet analysis unit configured to judge whether the packet received from the client is a registration processing request packet or a data processing request packet, wherein
    if the packet received from-the client is the registration processing request packet, the registration permission judgment unit executes a registration permission judgment process in accordance with a presence/absence detection process for the empty slot in the MAC address, and
    the registration processing unit executes a registration process in accordance with the judgment of the registration permission by the registration permission judgment unit.

4. The information processing apparatus according to claim 1, wherein
    if the packet received from the client is the data processing packet, the registration permission judgment unit executes the registration permission judgment process in accordance with the presence/absence detection process for the empty slot in the MAC address, and
    the registration processing unit executes the registration process for the MAC list in accordance with the judgment of the registration permission by the registration permission judgment unit, by acquiring the data containing the client MAC address from the received data processing request packet.

5. The information processing apparatus according to claim 1, wherein
    the registration permission judgment unit is configured to execute a process of judging whether or not a data processing request sequence from the client correctly and reliably executes a sequence in conformity with a UPnP protocol, and
    the registration processing unit is configured to execute the registration process for the MAC list in accordance with a judgment that the data processing request sequence from the client correctly and reliably executes the sequence in conformity with a UPnP protocol, by acquiring the data containing the client MAC address from the received data processing request packet.

6. The information processing apparatus according to claim 1, wherein
    the registration permission judgment unit is configured to judge whether a content directory service (CDS) request process in the sequence in conformity with the UPnP protocol is executed or not in response to a data processing request from the client, and
    the registration processing unit is configured to execute the registration process for the MAC list in accordance with a judgment that the content directory service (CDS)

request process is executed, by acquiring the data containing the client MAC address from the received data processing request packet.

7. The information processing apparatus according to claim 1, wherein
the registration processing unit is configured to execute the registration process for the MAC list by acquiring the MAC address and identification information different from the MAC address stored in the packet received from the client.

8. The information processing apparatus according to claim 7, wherein
the identification information different from the MAC address is identification information of global unique ID information or key information set to a client apparatus.

9. A server client system for connecting to a network to which a plurality of devices are connected and receiving an access request, comprising:
a client configured to, detect an activation of a communication process in the network based on a power-on process or an activation of a specific application, and to generate and transmit an access control list registration processing request packet storing a client MAC address in header information by using the detected information as a trigger; and
a server, including,
a storage unit configured to store a MAC list in which information for one client is set as registration data for one slot, the MAC list including a pre-determined number of empty slots that define openings in the MAC list for additional devices to be granted permission to access the information processing apparatus, the pre-determined number of the empty slots being set to change from empty to closed after a predetermined amount of time has lapsed, a closed slot being a slot on the MAC list that cannot be occupied by any device;
a registration permission judgment unit configured to confirm whether or not there is an empty slot in the MAC list and to judge that a registration is permitted only if there is the empty slot in the MAC list, in a client registration process based on a packet received from the client;
a registration processing unit configured to acquire the client MAC address from the received packet and to execute a registration process for the MAC list, in accordance with a judgment of the registration permission by the registration permission judgment unit; and
a control unit configured to change the pre-determined number of the empty slots from empty to closed in response to the lapse of the predetermined amount of time so that no empty slots exist in the MAC list.

10. The client server system according to claim 9, wherein the server is configured to execute a process of acquiring a sender MAC address contained in a header field on a packet received from the client and adopt the acquired sender MAC address as registration information for the MAC list.

11. An information processing method of generating an access control list in a router, comprising:
connecting, with a connecting unit in the router, to a network to which a plurality of devices are connected;
receiving, with a receiving unit in the router, a packet from a client that serves as an access requesting apparatus;
storing, at the router, a MAC list in which information for one client is set as registration data for one slot, the MAC list including a pre-determined number of empty slots that define openings in the MAC list for additional devices to be granted permission to access the information processing apparatus, the pre-determined number of the empty slots being set to change from empty to closed after a predetermined amount of time has lapsed, a closed slot being a slot on the MAC list that cannot be occupied by any device;
judging, at the router, whether or not there is an empty slot in the MAC list and permit a registration only if there is the empty slot in the MAC list, in a client registration process based on a received packet at the receiving unit;
acquiring, at the router, data containing a client MAC address from the received packet and to execute a registration process for the MAC list, in accordance with a judgment of the registration permission by the registration permission judgment unit; and
changing, at the router, the pre-determined number of the empty slots from empty to closed in response to the lapse of the predetermined amount of time so that no empty slots exist in the MAC list.

12. The information processing method according to claim 11, further comprising:
acquiring, with the acquiring unit in the router, a sender MAC address contained in a header field of the packet received from the client, and adopting the acquired sender MAC address as registration information of the MAC list.

13. The information processing method according to claim 11, further comprising:
judging, with the judging unit in the router, whether the packet received from the client is a registration processing request packet or a data processing request packet, wherein
if judged that the packet received from the client is the registration processing request packet, executing a registration permission judgment process in accordance with a presence/absence detection process for the empty slot in the MAC address.

14. The information processing method according to claim 11, wherein
if the packet received from the client is the data processing packet, executing the registration permission judgment process in accordance with the presence/absence detection process for the empty slot in the MAC address; and
executing the registration process for the MAC list in accordance with the judgment of the registration permission by the registration permission judgment unit, by acquiring the data containing the client MAC address from the received data processing request packet.

15. The information processing method according to claim 11, further comprising:
judging, with the judging unit in the router, whether or not a data processing request sequence from the client correctly and reliably executes a sequence in conformity with a UPnP protocol; and
executing, with an executing unit in the router, the registration process for the MAC list by acquiring the data containing the client MAC address from the packet received from the client in accordance with a judgment that the data processing request sequence from the client correctly and reliably executes the sequence in conformity with a UPnP protocol.

16. The information processing method according to claim 11, further comprising:
judging, with the judging unit in the router, whether a content directory service (CDS) request process in the sequence in conformity with the UPnP protocol is executed or not in response to a data processing request from the client; and executing, with an executing unit in the router, the registration process for the MAC list in accordance with a judgment that the content directory service (CDS) request process is executed, by acquiring the data containing the client MAC address from the packet received from the client.

17. The information processing method according to claim 11, further comprising:

executing, with an executing unit in the router, the registration process for the MAC list by acquiring the MAC address and identification information different from the MAC address stored in the packet received from the client.

18. The information processing method according to claim 17, wherein the identification information different from the MAC address is identification information of global unique ID information or key information set to a client apparatus.

19. A non-transitory computer-readable storage medium encoded with instructions, which when executed configure a router to generate an access control list method comprising:

connecting, with a connecting unit in the router, to a network to which a plurality of devices are connected, and receiving a packet from a client that serves as an access requesting apparatus;

storing, at the router, a MAC list in which information for one client is set as registration data for one slot, the MAC list including a pre-determined number of empty slots that define openings in the MAC list for additional devices to be granted permission to access the information processing apparatus, the pre-determined number of the empty slots being set to change from empty to closed after a predetermined amount of time has lapsed, a closed slot being a slot on the MAC list that cannot be occupied by any device;

judging, at the router, whether or not there is an empty slot in the MAC list and permit a registration only if there is the empty slot in the MAC list, in a client registration process based on a received packet at the receiving unit;

acquiring, at the router, data containing a client MAC address from the received packet and to execute a registration process for the MAC list, in accordance with a judgment of the registration permission by the registration permission judgment unit; and changing, at the router, the predetermined number of the empty slots from empty to closed in response to the lapse of the predetermined amount of time so that no empty slots exist in the MAC list.

* * * * *